US010169096B2

(12) United States Patent
Zeng et al.

(10) Patent No.: US 10,169,096 B2
(45) Date of Patent: Jan. 1, 2019

(54) IDENTIFYING MULTIPLE RESOURCES TO PERFORM A SERVICE REQUEST (71) Applicant: Hewlett-Packard Development Company, L.P., Houston, TX (US)

(72) Inventors: Jun Zeng, Palo Alto, CA (US); Sushant Bhattacharya, Bangalore (IN); Gary Joseph Dispoto, Palo Alto, CA (US); William James Allen, Corvallis, OR (US); Patrick O'Neil Sandfort, Vancouver, WA (US); Francisco Jose Oblea Ramirez, Guadalajara (MX); Steven John Simske, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 46 days.

(21) Appl. No.: 15/500,510

(22) PCT Filed: Oct. 23, 2014

(86) PCT No.: PCT/US2014/061918
§ 371 (c)(1),
(2) Date: Jan. 30, 2017

(87) PCT Pub. No.: WO2016/018445
PCT Pub. Date: Feb. 4, 2016

(65) Prior Publication Data
US 2017/0212788 A1    Jul. 27, 2017

(30) Foreign Application Priority Data
Jul. 30, 2014  (IN) ............................ 3721/CHE/2014

(51) Int. Cl.
G06F 9/46          (2006.01)
G06F 9/50          (2006.01)
(Continued)

(52) U.S. Cl.
CPC .............. G06F 9/505 (2013.01); G06F 3/121 (2013.01); G06F 3/1231 (2013.01); G06F 9/4881 (2013.01); G06F 2209/501 (2013.01)

(58) Field of Classification Search
None
See application file for complete search history.

(56) References Cited

U.S. PATENT DOCUMENTS 8,081,324 B2   12/2011   Taneda et al.
8,477,350 B2    7/2013   Jazayeri et al.
(Continued)

FOREIGN PATENT DOCUMENTS

JP    2013114515 A    6/2013

OTHER PUBLICATIONS

Lantronix New Google Cloud Print-certified Mobile Printing Solution for Businesses—Now Shipping, (Research Paper), Mar. 5, 2014, 9 pps. http://cloudcomputing.sys-con.com/node/2998400.
(Continued)

*Primary Examiner* — Gregory A Kessler
(74) *Attorney, Agent, or Firm* — HP Inc. Patent Department (57) ABSTRACT Examples herein disclose receiving a service request including a latency associated with a publication of a result of the service request. The examples disclose computing a workload for the service request and identifying multiple resources which are to perform the service request by applying the latency to the multiple resources.

13 Claims, 7 Drawing Sheets

(51) Int. Cl.
      *G06F 3/12*      (2006.01)
      *G06F 9/48*      (2006.01)

(56)          References Cited

U.S. PATENT DOCUMENTS

2004/0163085 A1    8/2004   Dillenberger et al.
2005/0183084 A1    8/2005   Cuomo
2006/0206894 A1    9/2006   Jung et al.
2008/0244600 A1   10/2008   Wong et al.
2013/0155441 A1    6/2013   Hong et al.
2013/0179371 A1    7/2013   Jain et al.

OTHER PUBLICATIONS

Xerox ® Mobile Print Cloud Information Assurance Disclosure, (Research Paper), Sep. 2012, 200 pps. http://www.officeproductnews.net/sites/www.officeproductnews.net/files/imce/XeroxWhitepaper_15.pdf.

IDENTIFYING MULTIPLE RESOURCES TO PERFORM A SERVICE REQUEST

BACKGROUND

Heterogeneous data is data from a multiple number of sources which may be unknown and unlimited in various formats. Heterogeneous data provides a mechanism to refer to data that may be of unknown format and/or unknown content.

BRIEF DESCRIPTION OF THE DRAWINGS

In the accompanying drawings, like numerals refer to like components or blocks. The following detailed description references the drawings, wherein.

DETAILED DESCRIPTION

Heterogeneous data may be collected from an unknown number of sources and in an unknown number of formats. Heterogeneous data may be managed and processed to complete job requests; however, these job requests may not be managed in accordance for estimating a world cad for the request and when the request may be completed. As such, this may decrease the quality of completing the job. For example, if a time to perform the request takes longer than a specified request, this may lower quality of service. Additionally, completing the workload maybe be limited due to computing capability of resources which may perform the workload. Further, this may cause issues for scheduling such job requests as time may be of the essence.

To address these issues, examples disclosed herein provide an efficient mechanism for adjusting a workload for a query and/or job request based on a maximum latency and the computing capability of multiple resources. Based on the workload, the examples may identify which resources are to perform the workload to ensure work is performed within a specified period of time.

The examples disclose receiving a service request which includes the job request and/or query and specifies the latency in which to perform the service request. The latency is a requirement pre-defined by a service requestor. The latency is a period of time in which the service requester requests results of the query based on the submission of the service request. For example, if the latency is five minutes, upon receiving the service request, the examples perform the service request and returns results within five minutes. In this context, the latency serves as an upper bound of time in which to publish results. Additionally, in this context, the latency is considered associated with the publication and/or delivery of the results of the service request.

Additionally, the computing system identifies multiple resources based on the latency and the workload to perform the service request. Identifying the multiple resources enables the computing system to take into account various computing capabilities, such as computing capacity and computing availability of each of the resources. For example, one resource may have a double processing core and thus may be able to process more data than a resource with a single processing core. This enables the computing system to take into account the computing capabilities of the resources to ensure results of the service request are published within the specified latency. Further, this enables the computing system to adjust the number, type and/or combination of the resources to ensure the service request is performed within the latency period.

Identifying which multiple resources are to perform the workload corresponding to the service request, enables the computing system to adjust the workload performed by each of the multiple resources for meeting the latency requirement. Such adjustment, in addition to the meeting the latency requirement, serves to optimize a business objective of the computing system. For example, the business objective may include minimizing a total cost of the resources for a particular service request.

In another example discussed herein, the resources are allocated and/or identified in a manner optimized to fulfill the service request efficiently within the latency period. This optimization takes into account variable conditions include a quantity of relevant data and a relationship of a quantity of the resources versus the latency period.

Thus, examples disclosed herein provide an efficient mechanism to balance and adjust workloads to various resources to ensure a performance of a service request within specified latency.

Figure 1:
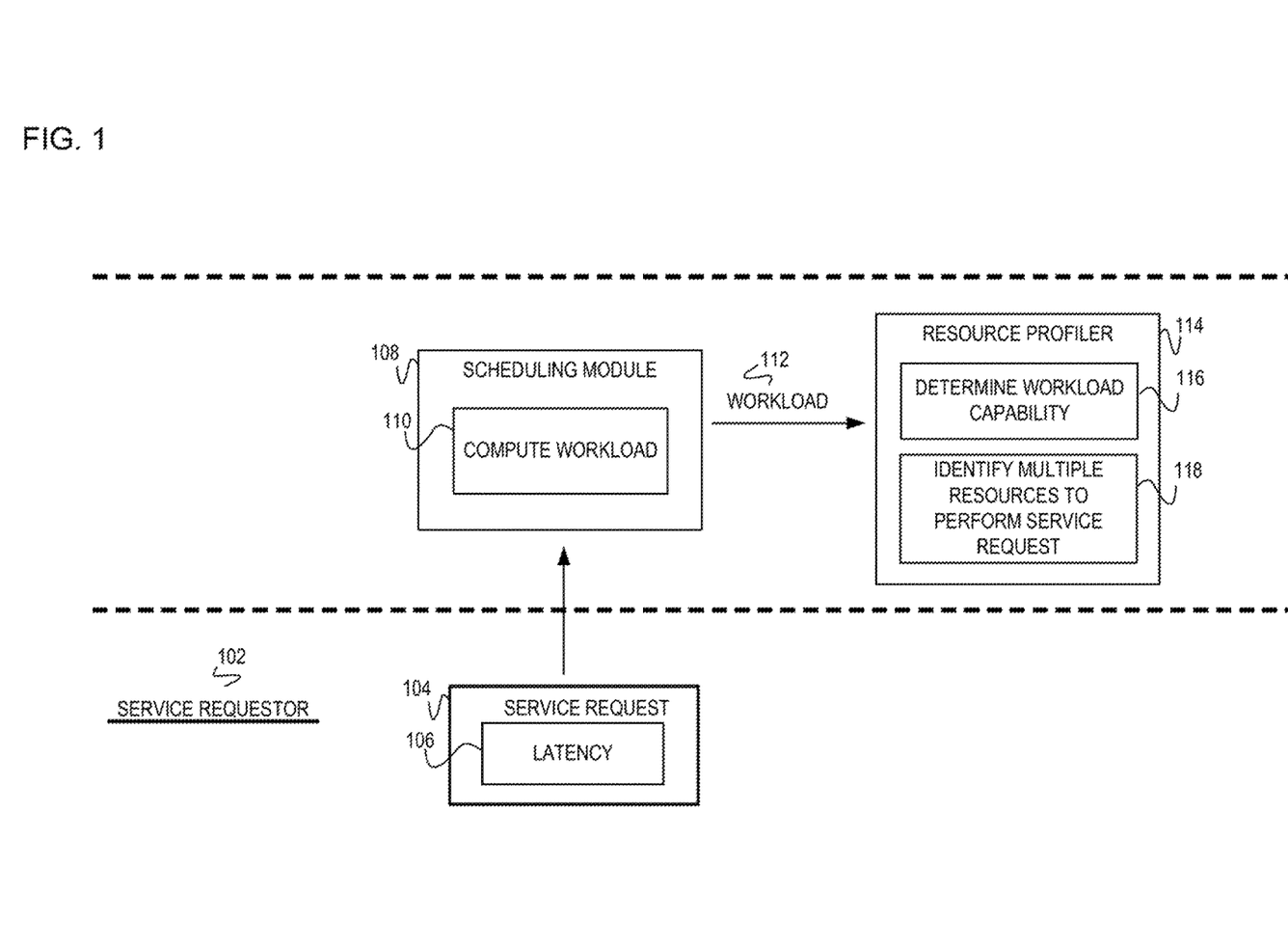
FIG. 1 is a block diagram of an example system including a service requestor to submit a service request including a latency to a scheduling module, the scheduling module computes a workload tot a resource profiler to identify multiple resources to perform the service request.

Referring now to the figures, FIG. 1 is a block diagram of an example computing system including a service requestor 102 to submit a service request 104 to a scheduling module 108. The service request 102 includes a latency 106 which specifies a maximum amount of time in which the computing system may publish results of the service request to the service requestor 102. Upon receiving, the service request 104, the scheduling module 108 computes a workload at module 110 for quantifying a workload 112 for performance of the service request 104. Upon receiving the quantified workload 112, a resource profiler 114 determines a workload capability of each multiple resource at module 116. From determining the workload capability at module 116, the resource profiler 114 proceeds to module 118 for identifying the multiple resources for completing the service request within the latency. The computing system in FIG. 1 represents a cloud computing type of system for delivery of a computing service rather than a product. In this example, the components within FIG. 1 may be shared and provided among computing devices within a network. In another implementation the computing system in FIG. 1 represents a virtual machine to which the service requester 102 may submit the service request 104 for a particular job query. Additionally, the dotted horizontal lines within FIG. 1 represent the various layers of the computing system. For example, the scheduling module 108 and the resource profiler 114 may be included as part of a data processing layer, while another layer may include a data storage area, data analysis area, etc. This may be explained in a later figure.

The service requestor 102 represents an entity from over the network or a local entity which submits the service request 104. The service requester 102 may include an individual, service, and/or machine which may desire certain results out of the computing system. Thus, the service requester 102 may drive data analysis through the submission of the service request 104. Although FIG. 1 illustrates the service requestor 102 as part of the computing system, this was done for illustration purposes as the service requestor 102 may be separate and/or independent of the computing system in FIG. 1.

The service request 104 is a request submitted by the service requester 102 over the network, As such, the service request 104 may be submitted using JavaScript Object Notation (JSON), extensible markup language (XML), or other type of format enabling the computing system to read the service request 104. The service request 104 includes a job request including a query specifying information about a particular component and the latency 106. For example, the job request may request information about when a printer may run out of ink and/or paper, etc. The latency 106 is defined as period of time between when the service request is submitted and the service requester 102 receives results of the service request 104. In this manner, the latency 106 is considered associated with the publication and/or delivery of the results of the service request 104 to the service requester 102. Additionally, the service request 104 may provide a filtering scheme in which to process the retrieved data for obtaining the data relevant to the service request 104.

The latency 106 is a requirement pre-defined by the service requester 102 as to when to publish results based on the submission of the service request 104. The latency 106 represents an upper time limit in which the user try desire results of the completed the service request 104; however, the results may also be published earlier than the latency 106 specification. For example, if the latency 106 includes 5 minutes, the results may be published in 5 minutes and under. In one implementation, upon receiving the service request 104 including the latency 106, the computing system creates a clock signal corresponding to the latency 106. In this implementation, the pre-defined latency 106 may include time intervals defining how often to publish results of the service request 104. For example, in this implementation, the clock signal indicates for the scheduling module 108 to retrieve data from the data storage area. Upon retrieving the data, the data may be filtered to obtain the data relevant to the service request 104. This implementation may be discussed in detail in a later figure. In another implementation, the latency 106 includes a frequency corresponding to how often results of the service request 104 are published to the service requestor 102.

The scheduling module 108 receives the service request 104 and as such computes the workload at module 110 for performing the query of information in the service request 104. In one implementation, the scheduling module 108 retrieves data from a data storage area within the computing system and filters the data to obtain data relevant to the service request 104. Implementations of the scheduling module 108 include by way of example, a virtual machine, controller, processing unit, instruction, set of instructions, process, operation, logic, technique, function, firmware, and/or software executable by a processing component (not illustrated) within the computing system in FIG, 1.

At module 110, the scheduling module 108 computes the workload for performing the service request 104. Computing the workload at module 110 includes obtaining a quantified expression for the workload 112 in such a manner that the resource profiler 114 is able to identify the multiple resources which can carry out the workload 112 for performing the service request 104. As such the quantified expression may include, by way of example, a single value, vector of values and/or other type of combination of values. Each value in the vector quantifies one aspect of the workload 112. Additionally, computing the workload at module 110 includes, by way of example, retrieving and filtering data to obtain data relevant to the service request 104. Thus, module 110 may include determining an amount of the relevant data, types of relevant data, determining a number of resources for computing the workload, determining a number of resources for performing the job in the service request 104, etc. Implementations of the module 110 include, by way of example, an instruction, set of instructions, process, operation, logic, technique, function, firmware, and/or software executable by a processing component (not illustrated) within the computing system in FIG. 1.

The workload 112, is the quantified amount of the workload computed at module 110. The resource profiler 114 uses the workload 112 as input to map the workload to various resources which may perform the service request 104. In one implementation, the workload 112 is converted into a resource profile which includes data points. The data points represent a relationship of a quantity and/or type of resources versus the latency. For example, the relationship may be expressed as a graph and/or chart representing the resources and various latencies. In another implementation, the workload 112 is expressed as a vector based on the relevant data obtained by the scheduling module 108. These implementations may be discussed in later figures.

The resource profiler 114 uses the workload 112 and at modules 116-118 determines the workload capability of each of the multiple resources and as such identifies those multiple resources which are to perform the service request 104. Determining the workload capability at module 116 enables the resource profiler 114 to adjust the workload performed by each of the multiple resources for meeting the latency 106 in the service request 104. Such adjustment, in addition to the meet the latency 106 requirement, also serves to optimize a business objective of the computing system. For example, minimize total cost of computing resources for a particular service request. Each of the multiple resources have a different computing capabilities, such as an amount and/or time in which the resources may process data. For example, one resource may have multiple processing cores, thus enabling this resource to process more relevant data than another resource which may have a single processing core. Implementations of the resource profiler 114 include, by way of example, a virtual machine, controller, processing unit, instruction, set of instructions, process, operation, logic, technique, function, firmware, and/or software executable by a processing component (not illustrated) within the computing system in FIG. 1.

At modules 116-118, upon receiving the workload 112, the resource profiler 114 determines the workload capability of each resource among multiple resources. Using the workload capability of each of the resources at module 116 enables the resource profiler 114 to identify the multiple resources which are each to carry out a different workload for performing the service request 104. Implementations of modules 116-118 include, by way of example, an instruction, set of instructions, process, operation, logic, technique, function, firmware, and/or software executable by the processing component (not illustrated) within the computing system in FIG. 1.

Figure 2A:
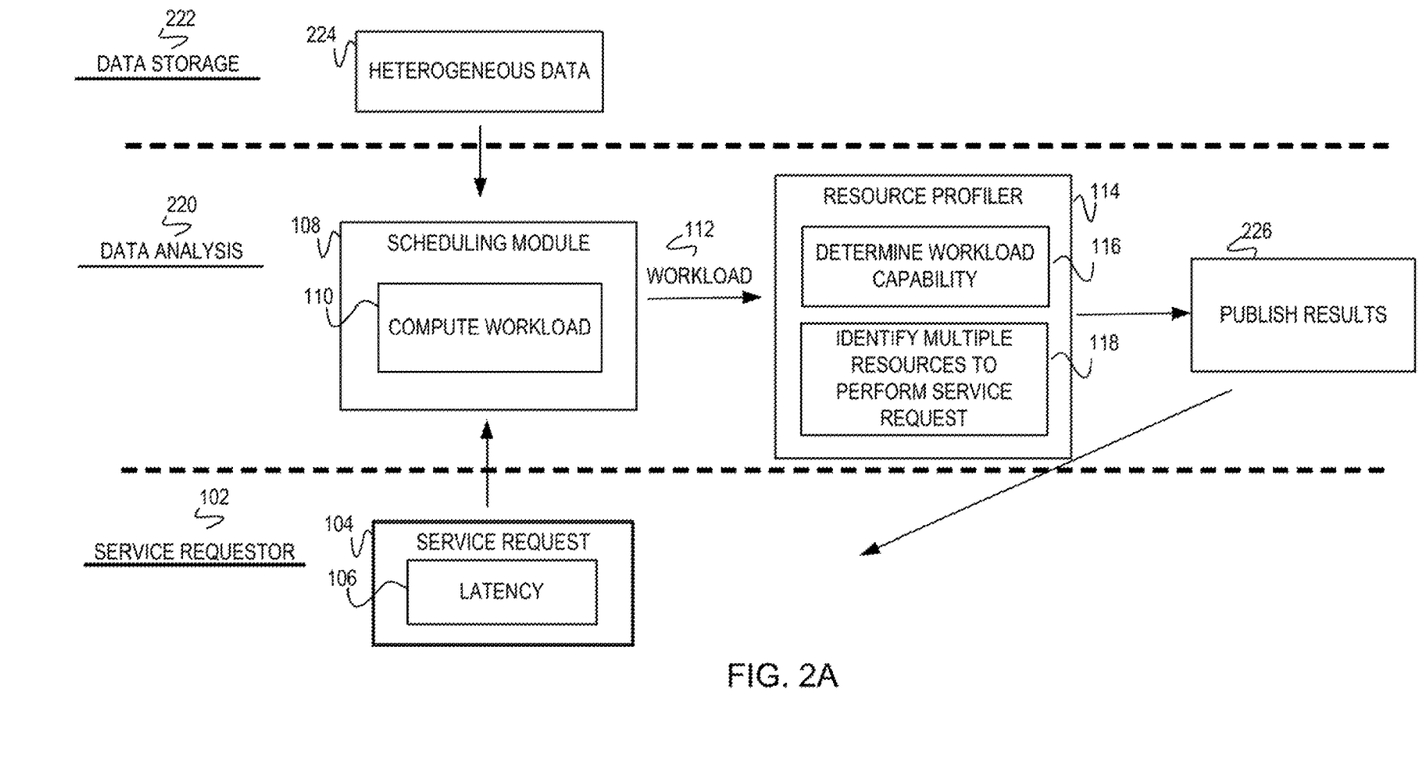
FIG. 2A is a block diagram of an example computing system including a service requestor to submit a service request to a scheduling module, the scheduling module retrieves heterogeneous data from a data storage area for computing a workload for input to a resource profiler that identifies multiple resources to perform the service request according to the workload and within a latency included within the service request.
Figure 2B:
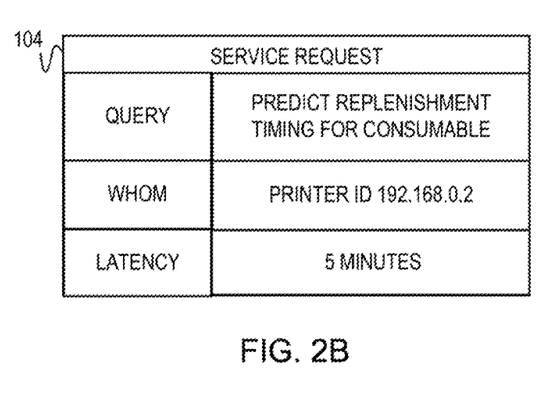
FIG. 2B is a block diagram of an example service request from a service requestor the service request includes a job request and a latency of the request.
Figure 2C:
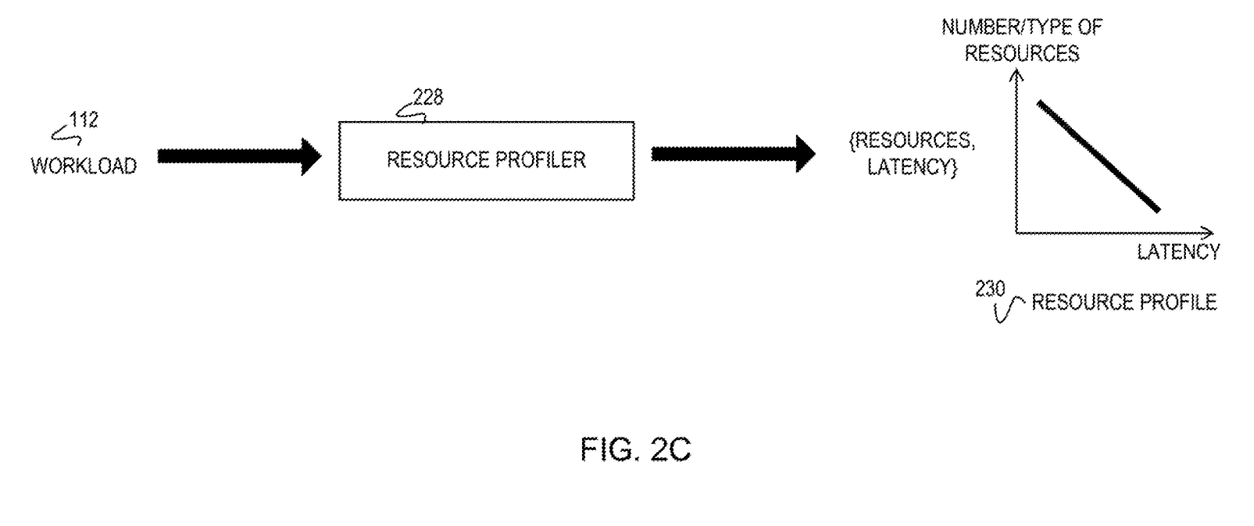
FIG. 2C is a block diagram of an example workload as input to convert into a resource profile.

FIGS. 2A-2C illustrate an example computing system to receive a service request including a job request and a latency in which to perform the job request. Additionally, FIG. 2C illustrates a workload as input for converting into a resource profile.

FIG. 2A is a block diagram of an example computing system including a service requestor 102 to submit a service request 104 including a latency 106 to a scheduling module 108. The scheduling module 108 retrieves heterogeneous data 224 from a data storage area 224 for filtering the heterogeneous data 224 to obtain data relevant to the service request 104. Upon obtaining the relevant data, the scheduling module 108 computes a workload at module 110. Computing the workload at module 110 provides a quantification of a workload 112 as input to a resource profiler 114. The resource profiler 114 determines workload capability and identifies multiple resources to perform the service request 104 at modules 116-118. Upon identifying the multiple resources, the workload is distributed to the multiple resources. Performing the service request at the multiple resources, the computing system may package these results for publication at module 226 to the service requestor 102.

FIG. 2B is a data diagram of an example service request 104 from a service requestor 102. The service request 104 includes a job request which is a query that specifies information. For example, the query includes a job request of predicting the replenishment time for a consumable. This may include predicting when to replenish paper, ink, etc. within a printer. Additionally, the service request 104 includes a component identifier which specifies which particular component the query is seeking information about. For example, the query is directed towards the specific printer identification to determine when to replenish the consumable for that printer. Further, the service request 104 includes the latency which specifies in which period of time to publish the results of the query to the service requestor 102. For example, the service request 104 in FIG. 2B specifies to return the results within five minutes. In another implementation, the latency includes a frequency of how often to return the results.

FIG. 2C is a block diagram of an example workload 112 as input to convert into a resource profiler 228 and in return, the resource profiler 228 outputs a resource profile 230. The workload 112 is a quantified amount of work which should be performed to fulfill the service request 104. For example, the workload 112 may include an amount of relevant data retrieved and filtered through based on the relevancy to the service request 104. The workload 112 is used as input to the resource profiler 228 to obtain the resource profile 230. Implementations of resource profiler 228 include, by way of example, an instruction, set of instructions, algorithm, process, operation, logic, technique, function, firmware, and/or software executable by a processing component within the computing system of FIG. 2A.

The resource profiler 228 includes computing, capability and characteristics of each of the multiple resources. Thus, the resource profiler 228 converts the workload and uses the computing capabilities of each of the multiple resources to return the resource profile 230. The resource profile 230 is a computing performance profile for a particular workload 112. The resource profile 230 includes a set of data points which defines a relationship of a quantity and/or type of resources versus the latency. This relationship may be expressed as a curve or other, type of graph. This enables a correlation based on the particular workload 112 between a number/type of resources and varying points of latency. For example, one axis includes a number and/or type of resources and another axis includes the various latencies. Thus, the computing system may apply the latency specified within the service request 104 to filter out which of the number and/or types of resources would not meet the latency requirement.

Figure 3:
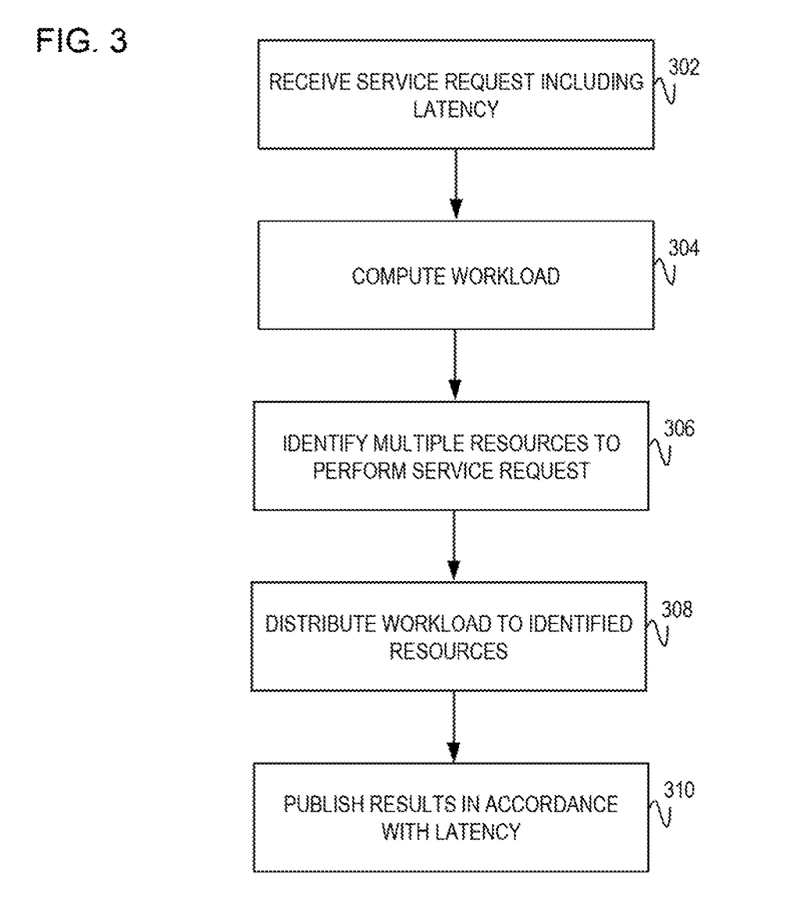
FIG. 3 is a flowchart of an example method to receive a service request including a latency and computing a workload for performing the service request, the method identifies multiple resources to perform the service request and publishes a result of the service request.
Figure 5:
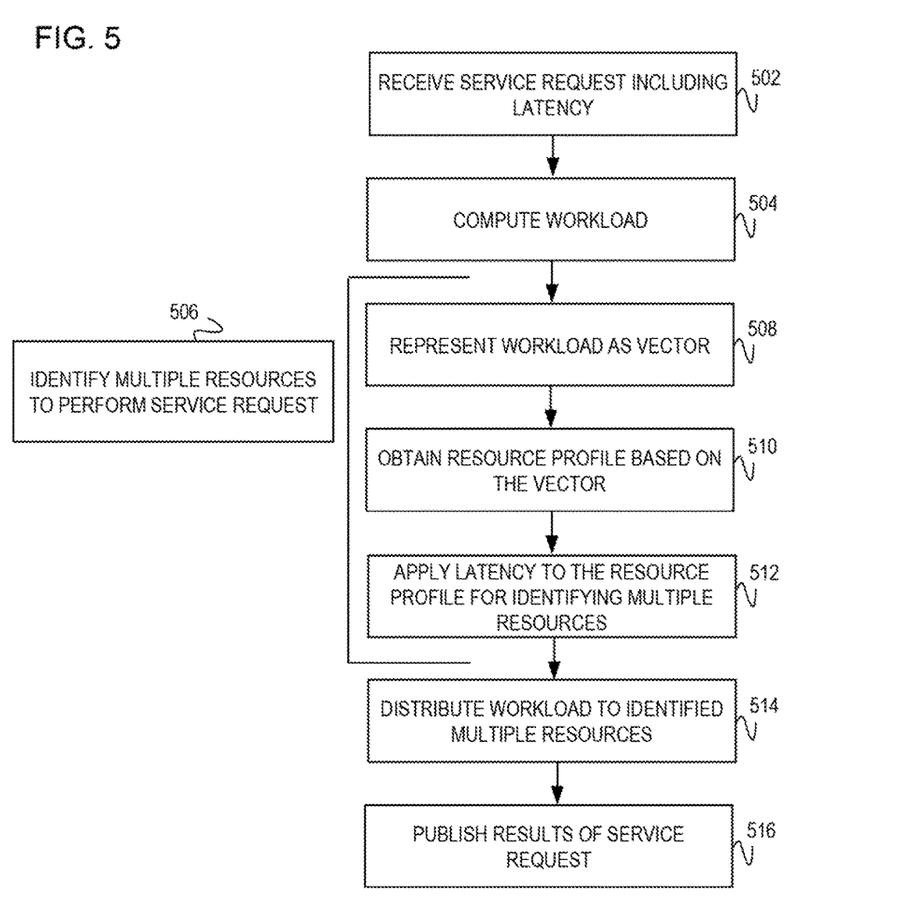
FIG. 5 is flowchart of an example method to receive a service request including a latency and identifying multiple resources to perform the service request by representing a workload as a vector to obtain a resource profile and applying the latency to the resource profile.

FIG. 3 is a flowchart of an example method to receive a service request including a latency and computing a workload for performing the service request. The method identifies multiple resources to perform the service request and publishes a result of the service request to a service requester. In discussing FIG. 3, references may be made to the components in FIGS. 1-2B to provide contextual examples. For example, a computing system which may include a scheduling module and resource profiler executes operations 302-310 to receive the request including the latency and performing the service request in compliance with the latency. Computing the workload and identifying which of the resources are to receive the workload for performing the service request enables the computing system to adjust the workload to various resources to perform the service request to comply with the latency. As such, the computing device includes, by way of example, a processing unit, a controller, a processor, a virtual machine as part of a computing system, etc. Further, although FIG. 5 is described as implemented by the computing device, it may be executed on other suitable components. For example, FIG. 5 may be implemented in the form of executable instructions on as machine-readable storage medium 604 as in FIG. 6.

At operation 302, the computing system receives the service request. The service request may be submitted over networking services and as such may be submitted using JavaScript Object Notation (JSON) extensible markup language (XML), or other type of format enabling the computing system to read the service request. The service request includes a job request, a latency, and/or identifying what component the job request is directed towards. The job request is a type of query about an aspect of the computing system while the identifier specifies which particular component the job request is seeking information about. For example, the query may request when a particular printer may run out of ink, thus the identifier may include the printer identification. At operation 302, the computing system creates a clock signal corresponding to the latency received as part of the service request The clock signal determines when the computing system retrieves data from a data storage area for filtering for the data relevant to the service request. Additionally, operation 302 includes determining the filtering scheme for processing the retrieved data to identify the relevant data. In this implementation, upon receiving the service request, the computing system assigns a relevancy score to different types of data. For example, if the service request pertains to a query about ink, then a column of data pertaining to paper usage is not as relevant and would be assigned a lower relevancy score than a column pertaining to how often a printer may complete print jobs.

At operation 304, the computing system computes the workload for performing the service request received, at operation 302. Computing the workload includes quantifying the workload for identifying multiple resources in which to perform the job received as the service request. The quantified workload includes data which may be retrieved and filtered for obtaining data relevant to the service request. Thus, operation 304 may include determining an amount of the relevant data, determining a number of resources for computing the workload, determining a number of resources for performing the job in the service request. In another implementation, the workload obtained from the relevant data may be expressed as a vector. Expressing the workload as the vector takes into consideration relevant data characterization and/or algorithm characterization for processing the relevant data. The data characterization includes, by way of example, a number of rows of relevant data, a number of columns of relevant data, and a number of complex relevant data types, such as the structure, etc. The algorithm characterization includes, by way of example, a number of operations to scan the relevant data and or a number of operations to process the relevant data.

At operation 306, the computing system identifies the multiple resources which are to perform the workload. Identifying the multiple resources identifies a combination of resources, the type of resources for performing the service request, etc. As each of the multiple resources may have different computing capabilities, operation 306 includes quantifying the resources. Quantifying the resources takes into account multiple factors including the computing capability of processing the workload at each of the resources and/or the quantities of relevant data for processing the workload to perform the service request. For example, quantifying the resources may consider a number of a type of resources, a number of processing cores at each of the resources, processing clock speed of each resource, memory assigned to each resource, and/or operating system of each resource. Thus considering the various factors, quantifying these resources may be expressed as a tuple. The tuple is a list of ordered elements to express the various types of factors of each of the resources. In one implementation, the computing system uses the workload at operation 304 as input to map the workload to the various resources. In this implementation, the computing system may obtain a performance profile which computes a number and/or type of resources across a latency period. Thus, applying the latency received at operation 302 to the performance profile, the computing system identifies the multiple resources which are to perform the workload. In this manner, operation 306 provides art estimation for performing the service.

At operation 308, the computing system distributes the workload computed at operation 304 to the identified multiple resources which are to perform the workload. Operation 308 may include specifying the relevant data to those multiple resources identified at operation 306 for accessing and processing of the relevant data to perform the service request. Operation 308 may include launching that number and/or type of resources identified at operation 306 to perform the service request. In one implementation, the distribution of the workload may, vary from resource to resource. For example, the computing capability for each of the resources may determine an amount of the workload that particular type of resource may handle.

At operation 310, the computing system publishes the results of the service request to the service requestor in accordance with the latency. Publishing the results includes disseminating the information of the results to the service requestor. As such, publishing the results of the service request include, by way of example, transmitting the results to the service requestor, packaging results from each of the multiple resources which performed the workload, and dispatching these results to the service request. Operation 310 may include storing the results of the service request within a data storage area upon receiving the results from each of the multiple resources.

Figure 4:
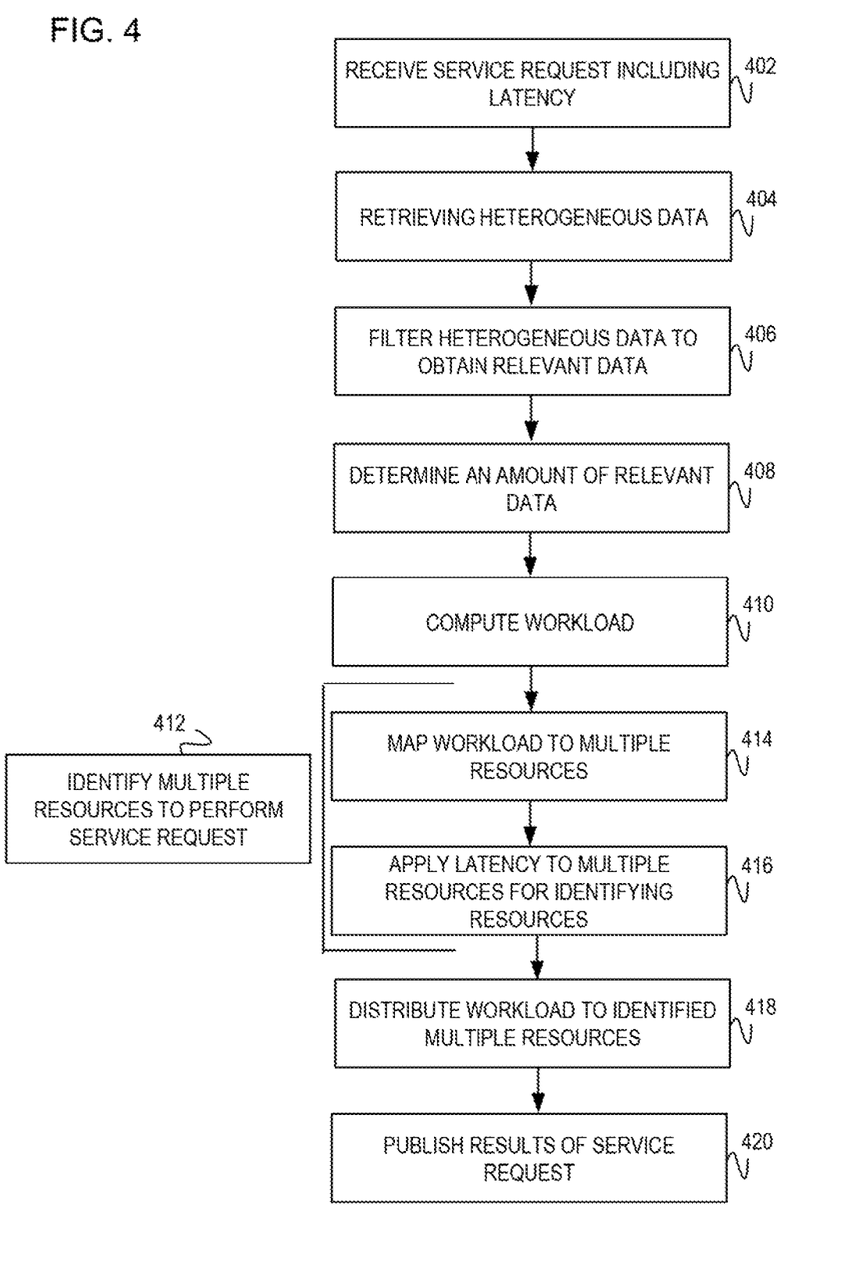
FIG. 4 is a flowchart of an example method to identify multiple resources for performing a service request by mapping a workload to multiple resources and applying a latency to the multiple resources for identifying the multiple resources which are to perform the workload.

FIG. 4 is a flowchart of an example method to receive a service request including a latency requirement. Upon receiving the service request, the method retrieves heterogeneous data for filtering to obtain data relevant to the service request. The method may proceed to determine an amount of the relevant data for computing the workload. Upon computing the workload, the method identifies which resources from among multiple resources are to perform the service request. The method identifies the multiple resources by mapping the workload to multiple resources and applies the latency requirement to the multiple resources for filtering which of the resources among the multiple resources are to, perform the workload so the service request is performed within, the latency requirement. In discussing FIG. 4, references may be made to the components in FIGS. 1-2B to provide contextual examples. For example, a computing system may include a scheduling module and resource profiler executes operations 402-420 to receive the service request and processing heterogeneous data to obtain the relevant data for identifying which multiple resources are to process the relevant data for performing the service request. As such, the computing device includes, by way of example, a processing unit, a controller, a processor, a virtual machine as part of a computing system, etc. Further, although FIG. 4 is described as implemented by the computing device, it may be executed on other suitable components. For example, FIG. 4 may be implemented in the thrill of executable instructions on a machine-readable storage medium 604 as in FIG. 6.

At operation 402, the computing system receives the service request including the latency requirement. The latency specifies a window of time in which to perform a job within the service request. As such, the computing system may consider the workload of the job and computing capabilities of the resources to ensure the service request is performed by the latency requirement. Operation 402 may be similar in functionality to operation 302 as in FIG. 3.

At operation 404, the computing system retrieves heterogeneous data from a data storage. The data storage may receive data of unknown format and from an unknown number of resources. Thus to process the heterogeneous data to obtain the data relevant to the service request, the computing system retrieves the heterogeneous data. In one implementation, upon receiving the service request at operation 402, the computing system sets a clock signal corresponding to the latency provided with the service request. This clock signal provides guidance for beginning a retrieval of the heterogeneous data. In another implementation, the computing system retrieves the most recent heterogeneous data from the data storage. In this implementation, the computing system may track which data may have already been retrieved in relation to a different service request. Thus, the computing system retrieves the data which has not yet been retrieved from the data storage.

At operation 406, the computing system filters the retrieved heterogeneous data to obtain data relevant to the service request. The service request includes data in which to identify the relevant data from the heterogeneous data. In one implementation, upon receiving the service request, the computing system assigns relevancy scores to different types of data. For example, if the service request pertains to a printing service, printing data may be given a higher relevancy score than data regarding heuristic information about networks. Using the relevancy score, the computing system may obtain the data relevant to the service request.

At operation 408, the computing system determines an amount of relevant data obtained at operation 406. The amount of relevant data may include quantifying a number of columns, data sets, data rows, and/or data sets to determine the amount of relevant data. Determining the amount of relevant data enables the computing system to compute the workload as at operation 410.

At operation 410, the computing system computes the workload. Computing the workload is a way for quantifying the workload for performing, the service request received at operation 402. In one implementation, the workload is quantified from the amount of relevant data determined at operation 408. Operation 410 may be similar in functionality to operation 304 as in FIG. 3.

At operation 412, the computing system identifies multiple resources which are to perform the service request received at operation 402. In one implementation, the computing system identifies the resources from among the resources by mapping the workload to the multiple resources and applying the latency requirement to the multiple resources to filter the various resources. Filtering the resources enables the computing system to identify which of the resources may handle the service request within the latency. Operation 412 may be similar in functionality to operation 306 as in FIG. 3.

At operation 414, the computing system maps the workload computed at operation 410 to various multiple resources. In one implementation, the workload is mapped through a performance profile. The performance profile includes a set of data points that includes a number, type, and/or combination of the resources on one axis and a continuing latency on the other axis. In this manner, the computing system may apply the latency requirement to determine the number, type, and/or combination of resources which would meet the latency requirement.

At operation 416, the computing system applies to the latency received as, part of the service request at operation 402 to the mapping of the workload to the multiple resources. The mapping at operation 414 includes a range of various latency requirements to determine at which point of the various latency requirements, which resources may be used to complete workload in accordance with the various latency requirements. Thus, operation 416 filters out the latency requirements that may be greater than the latency requirement received at operation 402. In doing so, the computing system also filters out the resources used to perform the workload at that filtered out latency. In this manner, the computing system may identify the multiple resources prior to distributing the workload to those multiple resources as at operation 418. Additionally, in this manner, the computing system takes into account the amount of relevant data for processing the service request.

At operation 418, the computing system distributes the workload to each of the resources identified at operation 412. The workload includes the relevant data as determined at operation 408, thus the computing system may vary the amount of relevant data to each of the resources depending on the computing capability of each of those resources and/or the number and types of resources allocated. For example, the resources are identified at operation 412 and allocated at operation 418 in a manner optimized to fulfill the latency request. This optimization considers quantities of relevant data at operation 408 and a relationship of the quantity of the resources versus latency. This enables the computing system to adjust the amount of workload to each of the resources to meet the latency condition received at operation 402. Operation 418 may be similar in functionality to operation 308 as in FIG. 3.

At operation 420, the computing system publishes the results of the service request to the service requestor. The publication of the results occurs within the latency period as defined at operation 302. The publication of the results includes disseminating the results of the performance of the service request to the service requestor. Operation 420 may be similar in functionality to operation 310 as in FIG. 3.

FIG. 5 is flowchart of an example method to receive a service request including a latency. Upon receiving the service request, the method computes a workload for performing the service request and identifies multiple resources which are to perform the workload. Identifying the multiple resources may include representing the workload as a vector for input to obtain a resource profile. Obtaining the resource profile, the method may apply the latency to the profile to determine which of the multiple resources are to perform the service request. Identifying the multiple resources, the method may proceed to distribute the workload to the identified multiple resources and publish results of the service request. In discussing FIG. 5, references may be made to the components in FIGS. 1-2B to provide contextual examples. For example, a computing system which may include a scheduling module and resource profiler executes operations 502-516 to distribute the workload to multiple resources for publishing a result of the service request. As such, the computing device includes, by way of example, a processing unit, a controller, a processor, a virtual machine as part of a computing system, etc. Further, although FIG. 5 is described as implemented by the computing device, it may be executed on other suitable components. For example, FIG. 5 may be implemented in the form of executable instructions on a machine-readable storage medium 604 as in FIG. 6.

At operation 502, the computing system receives the service request including the latency. The latency is a window of time to instruct the computing system of when to publish the results of the service request. For example, the latency may include 10 minutes which instructs an upper bound of time in which the computing system should publish results. In this example, the latency of 10 minutes means for the computing system to publish the results within 10 minutes. Operation 502 may be similar in functionality to operations 302 and 402 as in FIGS. 3-4.

At operation 504, the computing system computes the workload for performing the service request. As explained earlier, computing the workload includes quantifying the workload. As such, quantifying the workload includes an amount of relevant data which may be processed to perform the service request. Prior to operation 504, the relevant data may be retrieved and filtered according to a relevancy of the data to the service request received at operation 502. Computing the workload for the performance of the service request may include, by way of example, determining a number of the multiple resources for performing the service request, determining a computing capability of each of the resources, determining a type of the multiple resource, etc. In one implementation, computing the workload includes representing the workloads as a vector as at operation 508. Operation 504 may be similar in functionality to operations 304 and 410 as in FIGS. 3-4.

At operation 506, the computing system identifies which of the multiple resources are to perform the service request. Identifying the multiple resources based on the workload computed at operation 504 enables the computing system to estimate the computing capability and/or allowance of each of the resources to ensure the service request is performed within the latency period. In one implementation, the computing system identifies the multiple resources through representing the workload as a vector, using the workload vector as input to obtain the resource profile, and applying the latency to the resource profile to filter out types of resources, a number of resources, and/or combination of resources such as at operation 508-512. Operation 506 may be similar in functionality to operations 306 and 412 as in FIGS. 3-4.

At operation 508, the computing system expresses the workload as the vector. The vector is an expression of the workload for representing the various elements of the workload. Expressing the workload as enables the computing system to quantify the workload with these various elements and/or characterizations. For example, these various elements and/or characterizations may include relevant data characterization and/or algorithm characterization for processing the relevant data. The data characterization includes, by way of example, a number of rows of relevant data, a number of columns of relevant data, and a number of complex relevant data types, such as the structure, etc. The algorithm characterization includes, by way of example, a number of operations to scan the relevant data and/or a number of operations to process the relevant data. The workload vector may be used as input to obtain the resource profile as at operation 510.

At operation 510, the computing system obtains the resource profile based on the workload vector. The resource profile is a set of data points which shows which types and/or number of resources may fulfill the latency requirement. Specifically, the resource profile converts the workload vector into a resource and latency pair. For example, the resource profile max include a curve on which one axis may include a number and/or type of resources while the other axis includes a continuation of latency that extends past the latency requirement. Providing the resource profile enables the computing system to apply the latency requirement received at operation 502 to determine which of the number and/or type of resources would perform the service request within the latency requirement. The application of the latency to filter out which of the resources should be used for performing the service request occurs at operation 512.

At operation 512, the computing system applies the latency requirement to the resource profile to identify the number, combination and/or types of resources should perform the service request within the latency requirement. Upon identifying the multiple resources, the computing system proceeds to operations 514-516.

At operation 514, the computing system distributes the workload to the multiple resources identified at operation 506. The distribution of the workload may vary to each of the multiple resources depending on the computing capability for each of those resources. For example, one particular resource may be able to process and/or compute the data of the workload than another resource. Thus operation 512 adjusts the workload to each of the multiple resources including the number of resources and/or type of resources. Adjusting the workload takes into account to the latency to ensure the service request is performed within the latency period established by the service request. Operation 514 may be similar in functionality to operations 308 and 418 as in FIGS. 3-4.

At operation 516, the results of the service request are published to the service requester. Publishing the results includes disseminating the information of the results to the service requester. As such, publishing the results of the service request include, by way of example, transmitting the results to the service requester, packaging results from each of the multiple resources which performed the workload, and dispatching these results to the service request. Operation 516 may include storing the results of the service request within a data storage area upon receiving the results from each of the multiple resources. Operation 516 may be similar in functionality to operations 310 and 420 as in FIGS. 3-4.

Figure 6:
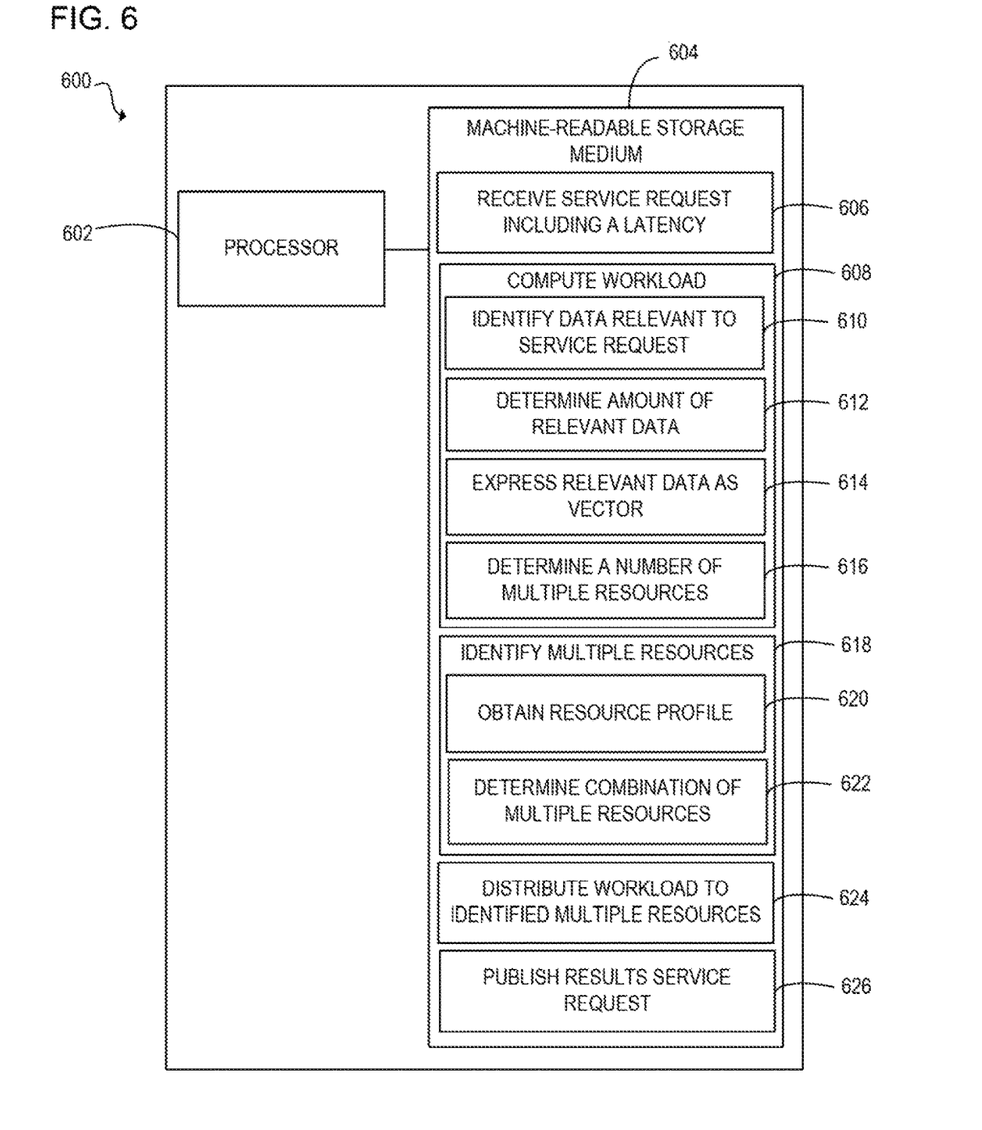
FIG. 6 is a block diagram of an example computing device with a processor to execute instructions in a machine-readable storage medium, for receiving a service request specifying a latency and publishing results of the service request in accordance with the latency.

FIG. 6 is a block diagram of computing device 600 with a processor 602 to execute instructions 606-626 within a machine-readable storage medium 404. Specifically, the computing device 600 with the processor 602 receives a service request including a latency, computes a workload to perform the service request, and identifies multiple resources to perform the workload based on computing capability of each of the multiple resources. Upon identifying the multiple resources, the processor 602 may proceed to distribute the workload and then publish results of the service request. Although the computing device 600 includes processor 602 and machine-readable storage medium 604, it may also include other components that would be suitable to one skilled in the art. For example, the computing device 600 may include a data storage area as in FIG. 2A. The computing device 600 is an electronic device with the processor 602 capable of executing instructions 606-626, and as such embodiments of the computing device 600 include a computing device, mobile device, client device, personal computer, desktop computer, laptop, tablet, video game console, or other type of electronic device capable of executing instructions 606-626. The instructions 606-626 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory.

The processor 602 may fetch, decode, and execute instructions 606-626 to receive the service request including the latency and identify multiple resources based on the latency to perform a workload from service request and publish results of the service request. In one implementation, upon executing instruction 606, the processor 602 may execute instruction 608 through executing instruction 610-616. In another implementation, upon executing instructions 606-608, the processor 602 may execute instruction 618 by performing a combination of instructions 620-622. In a further implementation, upon executing instruction 618, the processor 602 may proceed to execute instructions 624-626. Specifically, the processor 602 executes instructions 606-616 to receive the service request including the latency defining a time limit of when to return results of the service request; compute the workload for performing the service request; identify relevant data to the service request; determine an amount of the relevant data to the service request; express the amount of relevant data as a workload; and determine a number of multiple resources for performing the service request. The processor 602 may proceed to execute instructions 618-622 to: identify the multiple resources; obtain a resource profile expressing the number and/or combination of the multiple resources in a continuing latency time frame; and using the latency received with the service request, apply the latency to the resource profile to determine the combination of the multiple resources for performing the service request. The process 602 may then proceed to execute instructions 624-626 to: distribute the workload for performing the service request to the identified multiple resources; and publish the results of the service request performed at the identified multiple resources.

The machine-readable storage medium 604 includes instructions 606-626 for the processor 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network, storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

Thus, examples disclosed herein provide an efficient mechanism to balance and adjust workloads to various resources to ensure a performance of a service request within specified latency.

We claim:

1. A method for scheduling a service request, the method comprising:
   receiving the service request including a latency associated with a publication of a result of the service request;
   retrieving heterogeneous data upon the receipt of the service request;
   filtering the heterogeneous data to obtain data relevant to the service request;
   determining an amount of relevant data prior to computing a workload for the service request;
   computing the workload for the service request;
   identifying multiple resources, based on the latency and the workload, to perform the service request;
   distributing the workload to the identified multiple resources; and
   publishing the results of the service request in accordance with the latency.

2. The method of claim 1 wherein computing the workload comprises:
   identifying the data relevant to the service request; and
   determining the amount of the relevant data.

3. The method of claim 1 wherein identifying the multiple resources, based on the latency and the workload, to perform the service request comprises:
   representing the workload as a vector;
   obtaining a resource profile of the multiple resources for the workload; and
   applying the latency to the resource profile to identify the multiple resources for performing the service request.

4. The method of claim 1 wherein identifying the multiple resources, based on the latency and the workload, to perform the service request comprises
   mapping the workload to multiple resources; and
   applying the latency to the multiple resources for identifying the multiple resources to perform the service request.

5. The method of claim of claim 1 wherein identified multiple resources include multiple virtual machines with different computing capabilities.

6. A system comprising a processor to:
   receive a service request including a latency associated with a publication of a result of the service request;
   retrieve heterogeneous data;
   filter the heterogeneous data for obtaining data relevant to a service request;
   compute a workload for the service request;
   determine a workload capability for each of multiple resources; and
   identify the multiple resources that are to perform the service request by applying the latency to the multiple resources, wherein the relevant data is represented as the workload for identifying the multiple resources.

7. The system of claim 6, wherein the processor is to publish results of the service results in accordance with the latency.

8. The system of claim 6, wherein the processor is to distribute the workload to the identified multiple resources, the distribution of the workload is different for each of the identified multiple resources.

9. The system of claim 6 comprising:
   a data storage to maintain heterogeneous data for retrieval by the scheduling module for computing the workload.

10. A non-transitory machine-readable storage medium comprising instructions that when executed by a processing resource cause a computing device to:
    retrieve heterogeneous data;
    filter the heterogeneous data for obtaining data relevant to a service request;
    compute a workload for the service request, wherein the service request includes a latency associated with a publication of result of the service request;
    identify multiple resources, based on the latency and the workload, to perform the service request, wherein the relevant data is represented as the workload for identifying the multiple resources;
    distribute the workload to the identified multiple resources, wherein the distribution of the workload is different for each of the identified multiple resources; and
    publish the results of the service request in accordance with the latency.

11. The non-transitory machine-readable storage medium of claim 10 comprising instructions that when executed by the processing resource cause the computing device to:
    receive the service request.

12. The non-transitory machine-readable storage medium of claim 10 wherein computing the workload is comprising instructions that when executed by the processing resource causes the computing device to:
    identify the data relevant to the service request;
    determine an amount of the relevant data; and
    express the relevant data as a vector of the workload; and determine a number of the multiple resources to perform the workload.

13. The non-transitory machine-readable storage medium of claim 10 wherein identifying the multiple resources, based on the latency and the workload, to perform the service request is comprising instructions that when executed by the processing resource causes the computing device to:
  obtain a resource profile for workload, the resource profile includes the multiple resources; and
  determine a combination of the multiple resources for identifying the multiple resources to perform the service request based on the latency.

* * * * *

UNITED STATES PATENT AND TRADEMARK OFFICE
CERTIFICATE OF CORRECTION

PATENT NO. : 10,169,096 B2
APPLICATION NO. : 15/500510
DATED : January 1, 2019
INVENTOR(S) : Jun Zeng et al.

Page 1 of 1

It is certified that error appears in the above-identified patent and that said Letters Patent is hereby corrected as shown below:

In the Claims

In Column 14, Claim 5, Line 10, delete "claim of claim 1" and insert -- claim 1 --, therefor.

Signed and Sealed this
Sixteenth Day of April, 2019

Andrei Iancu
*Director of the United States Patent and Trademark Office*